(12) United States Patent
Iwano et al.

(10) Patent No.: US 10,704,738 B2
(45) Date of Patent: Jul. 7, 2020

(54) HIGH-PRESSURE VESSEL

(71) Applicant: TOYOTA JIDOSHA KABUSHIKI KAISHA, Toyota-shi, Aichi-ken (JP)

(72) Inventors: Yoshihiro Iwano, Toyota (JP); Osamu Sawai, Toyota (JP); Motomu Iitsuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 50 days.

(21) Appl. No.: 15/902,530

(22) Filed: Feb. 22, 2018

(65) Prior Publication Data
US 2018/0299074 A1 Oct. 18, 2018

(30) Foreign Application Priority Data
Apr. 18, 2017 (JP) ................................. 2017-082042

(51) Int. Cl.
| F17C 13/06 | (2006.01) |
| F17C 1/06  | (2006.01) |
| F17C 1/16  | (2006.01) |

(52) U.S. Cl.
CPC ............... *F17C 13/06* (2013.01); *F17C 1/06* (2013.01); *F17C 1/16* (2013.01); *F17C 2201/0109* (2013.01); *F17C 2201/056* (2013.01); *F17C 2201/058* (2013.01); *F17C 2203/0604* (2013.01); *F17C 2203/066* (2013.01); *F17C 2203/067* (2013.01); *F17C 2203/0619* (2013.01); *F17C 2203/0621* (2013.01); *F17C 2203/0646* (2013.01); *F17C 2203/0648* (2013.01); *F17C 2203/0663* (2013.01); *F17C 2203/0665* (2013.01); *F17C 2205/0305* (2013.01); *F17C 2205/037* (2013.01); *F17C 2205/0308* (2013.01);
(Continued)

(58) Field of Classification Search
CPC .... F17C 13/06; F17C 1/06; F17C 1/16; F17C 2203/0604; F17C 2203/0619; F17C 1/04; F17C 1/08; F17C 1/02; F17C 2203/0609; F17C 2203/0668
USPC ........................................................ 220/589
See application file for complete search history.

(56) References Cited

U.S. PATENT DOCUMENTS 5,758,796 A * 6/1998 Nishimura ................ F17C 1/06
220/590
2002/0088806 A1 7/2002 Takaku et al.
(Continued)

FOREIGN PATENT DOCUMENTS

CN 1087063 C 7/2002
JP 2002-188794 A 7/2002
(Continued)

*Primary Examiner* — Robert Poon
(74) *Attorney, Agent, or Firm* — Oliff PLC (57) ABSTRACT

A high-pressure vessel includes: a body portion formed in a cylindrical shape, with at least one end portion of the body portion, in an axial direction thereof, being open; a cap, at least part of which is inserted inside at least one open end portion of the body portion to plug the at least one open end portion; a first reinforcement layer provided on an outer peripheral surface of the body portion and made of fiber-reinforced plastic, a fiber direction of which coincides with a circumferential direction of the body portion; and a second reinforcement layer integrated with the first reinforcement layer and made of fiber-reinforced plastic including fibers that bridge one end portion and another end portion, in the axial direction, of the body portion.

10 Claims, 9 Drawing Sheets

(52) U.S. Cl.
CPC ............. *F17C 2205/0323* (2013.01); *F17C 2205/0338* (2013.01); *F17C 2205/0397* (2013.01); *F17C 2209/2154* (2013.01); *F17C 2209/228* (2013.01); *F17C 2209/234* (2013.01); *F17C 2221/011* (2013.01); *F17C 2221/012* (2013.01); *F17C 2221/014* (2013.01); *F17C 2221/033* (2013.01); *F17C 2223/0123* (2013.01); *F17C 2223/0161* (2013.01); *F17C 2223/036* (2013.01); *F17C 2260/011* (2013.01); *F17C 2265/065* (2013.01); *F17C 2270/0168* (2013.01); *F17C 2270/0184* (2013.01); *Y02E 60/321* (2013.01)

(56) References Cited

U.S. PATENT DOCUMENTS

| | | | | |
|---|---|---|---|---|
| 2003/0066836 A1* | 4/2003 | Sakaguchi | ............. | F17C 1/06 220/581 |
| 2011/0210128 A1* | 9/2011 | Strack | ............. | F16J 12/00 220/592 |
| 2014/0014667 A1* | 1/2014 | Flammer | ............. | F17C 1/16 220/590 |
| 2015/0014332 A1* | 1/2015 | Nishibu | ............. | F17C 1/02 220/586 |
| 2015/0192251 A1* | 7/2015 | Tupper | ............. | B65D 25/14 220/589 |
| 2017/0254477 A1* | 9/2017 | Schimenti | ............. | F17C 1/06 |
| 2018/0299067 A1* | 10/2018 | Swan | ............. | F17C 1/06 |
| 2019/0120435 A1* | 4/2019 | Lanzl | ............. | F17C 1/02 |

FOREIGN PATENT DOCUMENTS

| | | |
|---|---|---|
| JP | 2010-265931 A | 11/2010 |
| JP | 2016-044792 A | 4/2016 |
| JP | 2018-112201 A | 7/2018 |
| WO | 2017/060829 A1 | 4/2017 |

\* cited by examiner

HIGH-PRESSURE VESSEL

CROSS-REFERENCE TO RELATED APPLICATION

This application is based on and claims priority under 35 USC 119 from Japanese Patent Application No. 2017-082402 filed on Apr. 18, 2017, which is incorporated by reference herein.

BACKGROUND

Technical Field

The present disclosure relates to a high-pressure vessel.

Related Art

Japanese Patent Application Laid-open (JP-A) No. 2002-188794 discloses a high-pressure hydrogen tank serving as a vessel. The high-pressure hydrogen tank is configured to include a liner formed in a barrel shape and a reinforcement layer wound around the liner and configured by fiber-reinforced plastic. This configuration enhances the rigidity of the liner, so the high-pressure hydrogen tank can hold high-pressure hydrogen inside.

However, because the high-pressure hydrogen tank disclosed in JP-A No. 2002-188794 is a large tank shaped like a barrel, there are cases where the cabin space and/or luggage space is reduced to install the high-pressure hydrogen tank in a vehicle. That is to say, there is the potential to not be able to efficiently utilize the vehicle space. To address this point, it is conceivable to provide plural small open cylindrical tanks that can be disposed in an empty space in the vehicle. However, in the case of an open cylindrical tank, it is necessary to provide caps to plug both axial direction end portions of the open cylindrical tank, but because of the pressure of the fluid inside the tank, loads in the directions in which the caps detach from the tank body arise in the caps. Consequently, there is room for improvement to improve the pressure resistance of the tank while efficiently utilizing the vehicle space.

SUMMARY

In consideration of the circumstances described above, it is an object of the present disclosure to obtain a high-pressure vessel that can improve the pressure resistance of the vessel.

A high-pressure vessel of an aspect includes: a body portion that is formed in an open cylindrical shape, with at least one end portion of the body portion in the axial direction thereof being open; a cap, at least part of which is inserted inside the open end portion of the body portion to thereby plug the end portion; a first reinforcement layer provided on an outer peripheral surface of the body portion and configured by fiber-reinforced plastic whose fiber direction coincides with the circumferential direction of the body portion; and a second reinforcement layer integrated with the first reinforcement layer and configured by fiber-reinforced plastic including fibers that bridge the one end portion and the other end portion in the axial direction of the body portion.

DESCRIPTION OF EMBODIMENTS

An embodiment of the present disclosure will be described below using FIG. 1 to FIG. 5.

Figure 1:
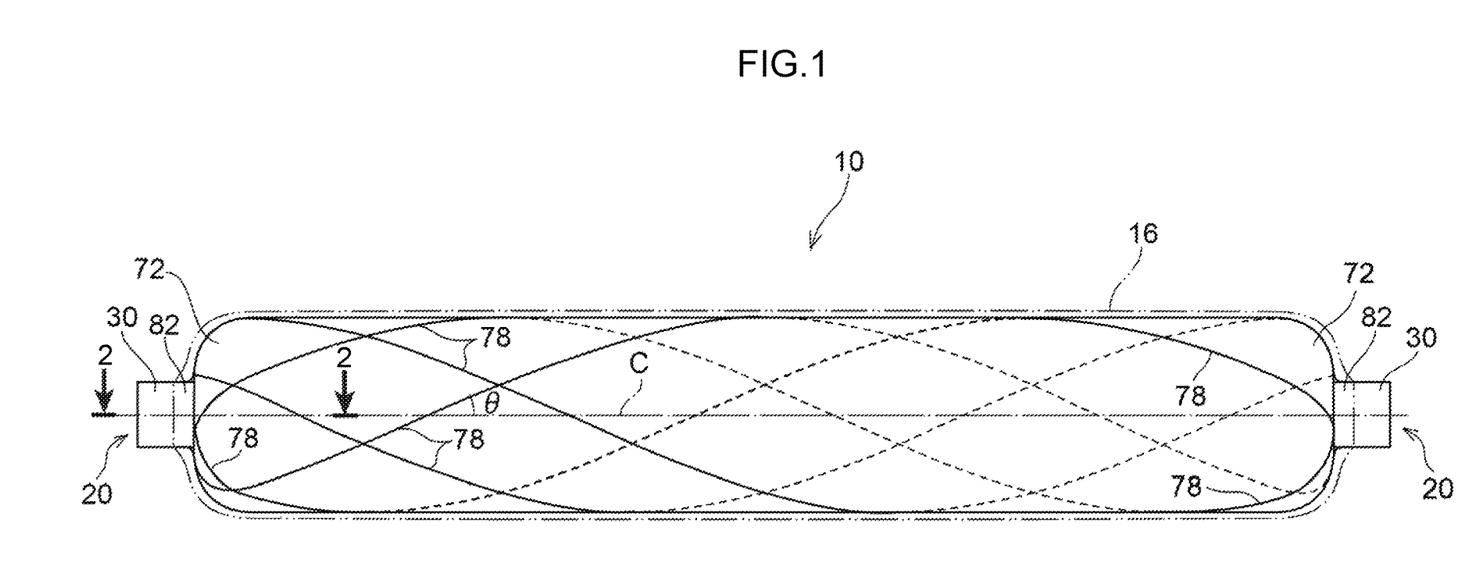
FIG. 1 is a schematic side view showing a high-pressure vessel pertaining to a first embodiment.

A tank module provided in a vehicle is configured by combining more than one high-pressure tank 10 serving as a high-pressure vessel shown in FIG. 1. As an example, the tank module has a configuration where the high-pressure tanks 10 are arranged side by side on the vehicle underside of a floor panel of a fuel cell vehicle and are coupled to each other.

Figure 2:
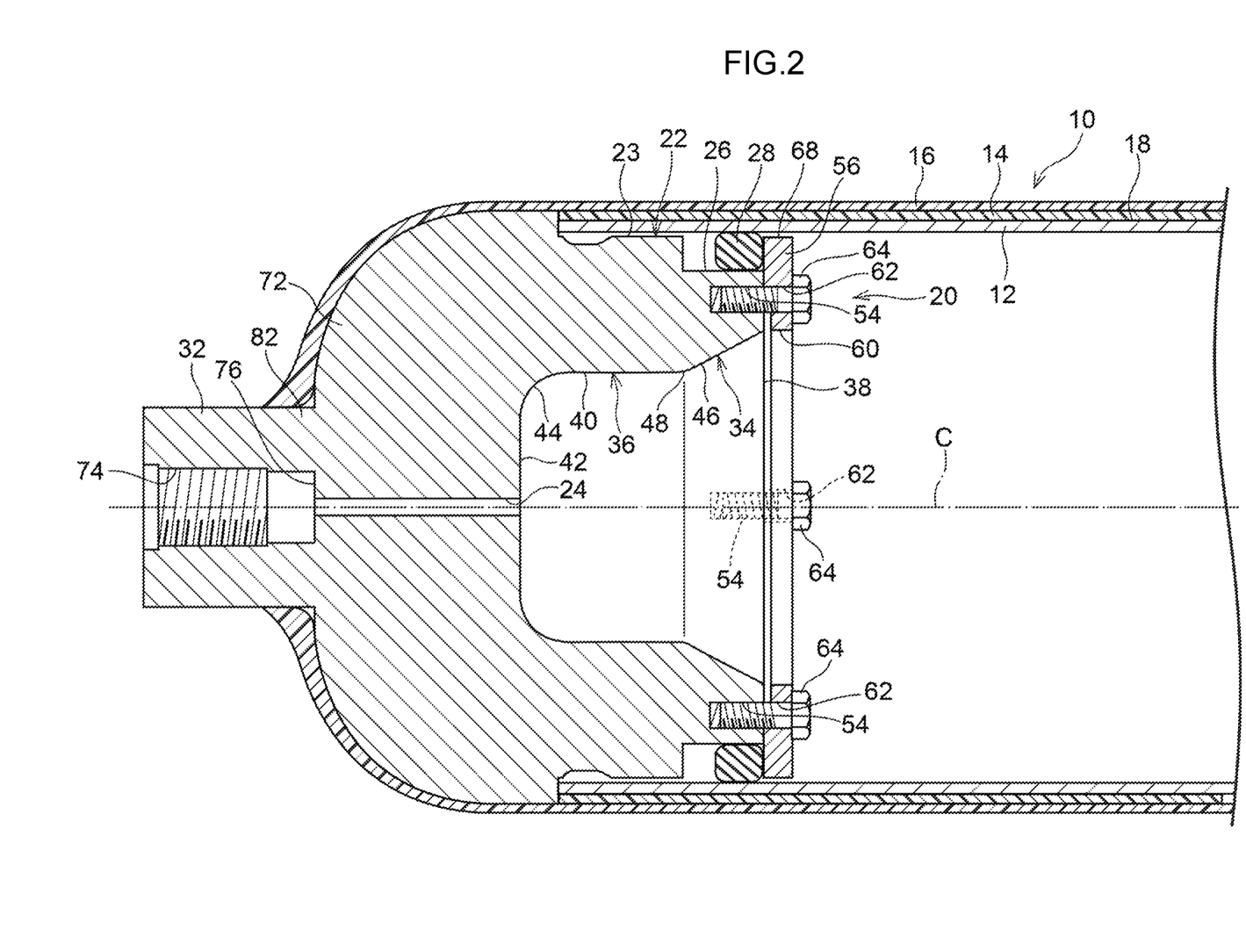
FIG. 2 is an enlarged cross-sectional view showing a cross section of the high-pressure vessel as cut along line 2-2 of FIG. 1.

The high-pressure tank 10 is formed in a substantially closed cylindrical shape whose axial direction (longitudinal direction) coincides with the vehicle width direction or the vehicle front and rear direction as an example. As shown in FIG. 2, the high-pressure tank 10 is configured to include a body portion 12, a first reinforcement layer 14, and a second reinforcement layer 16. The body portion 12 is formed in an open cylindrical shape whose axial direction end portions are open and is configured by aluminum alloy as an example. It will be noted that the body portion 12 has a radial dimension capable of being accommodated in an empty space on the vehicle underside of the floor panel.

The first reinforcement layer 14 is a carbon fiber-reinforced plastic (CFRP) sheet and is wound around an outer peripheral surface 18 of the body portion 12. Inside the first reinforcement layer 14, carbon fibers are arrayed along the circumferential direction of the body portion 12. In other words, the fiber direction of the first reinforcement layer 14 coincides with the circumferential direction of the body portion 12.

A pair of caps 20 are respectively inserted into the end portion on one axial direction side and the end portion on the other axial direction side of the body portion 12 of the high-pressure tank 10. The caps 20 are formed in substantially domed shapes that are convex outward in the axial direction (see FIG. 4B). Each cap 20 has a body insertion portion 22, a communicative flow path 24, and a projecting portion 30. The body insertion portion 22 is disposed in a position corresponding to the body portion 12, and is formed in a substantially open cylindrical shape that projects inward in the axial direction and has a later-described recess portion 32 that opens toward the inside of the body portion 12. An outer peripheral surface 23 of the body insertion portion 22 opposes the inner peripheral surface of the body portion 12.

The recess portion 32 provided inside the body insertion portion 22 has a shape that is recessed outward in the axial direction. The recess portion 32 has a tapered portion 34 and a horizontal portion 36. The tapered portion 34 is disposed on an end face 38 side of the distal end portion of the body insertion portion 22 and is formed in such a way that its diameter decreases outward in the axial direction. Furthermore, the horizontal portion 36 is disposed on the axial direction outer side of the recess portion 32 and is formed in a bottomed open cylindrical shape along the axial direction. Moreover, a side wall portion 40 and a bottom wall portion 42 of the horizontal portion 36 are connected to each other via a circular arc-shaped circular arc portion 44. Similarly, the side wall portion 40 of the horizontal portion 36 and a side wall portion 46 of the tapered portion 34 are connected to each other via a circular arc portion 48. It will be noted that an opening of the later-described communicative flow path 24 is provided in the bottom wall portion 42 of the horizontal portion 36.

A packing accommodating portion 26 formed by cutting out the outer edge portion of the distal end portion (axial direction inner side) of the body insertion portion 22 is provided in the distal end portion of the body insertion portion 22, and an O-ring 28 is accommodated inside the packing accommodating portion 26. The O-ring 28 is in abutting contact with the inner peripheral surface of the body portion 12 as a result of being elastically deformed along the radial direction of the body portion 12.

Figure 4A:
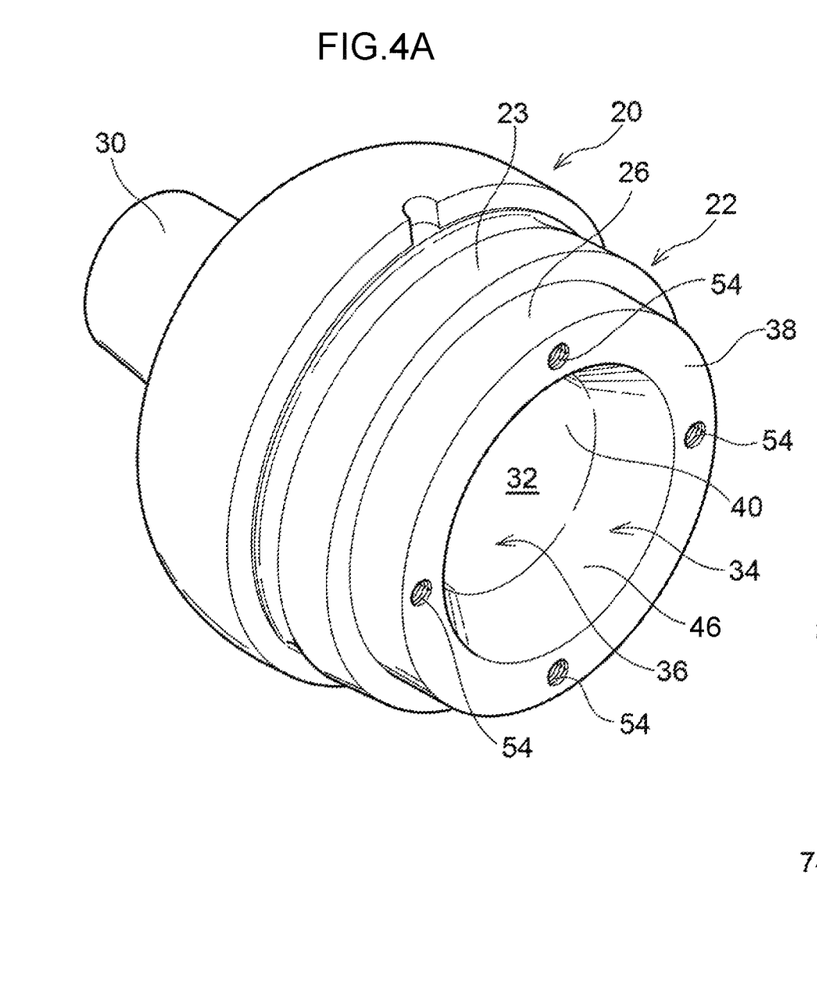
FIG. 4A is a perspective view showing the cap of the high-pressure vessel pertaining to the first embodiment as seen from inside in the axial direction.
Figure 4B:
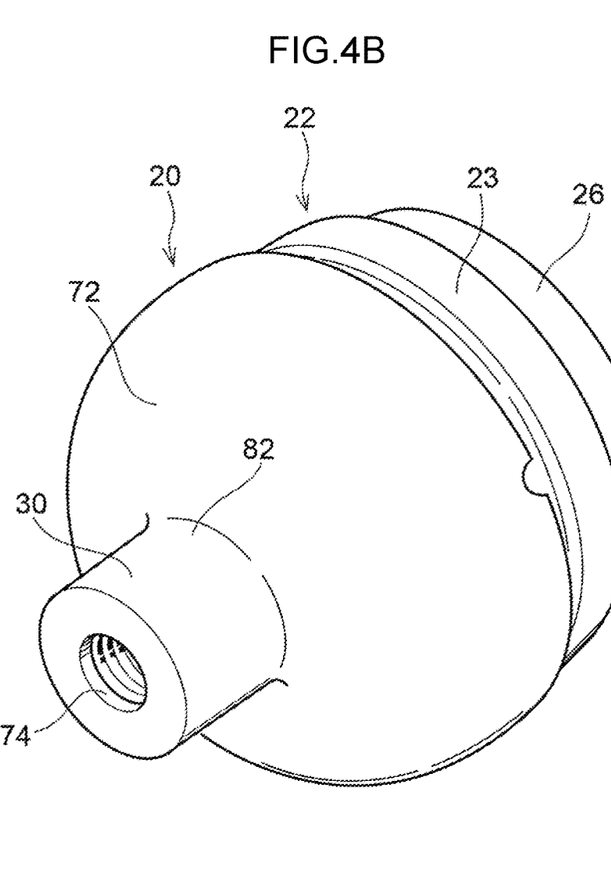
FIG. 4B is a perspective view showing the cap of the high-pressure vessel pertaining to the first embodiment as seen from outside in the axial direction in contrast to FIG. 4A.

Plural (in the present embodiment, four as an example) fastening holes 54 are formed in the end face 38 of the body insertion portion 22 (see FIG. 4A). Furthermore, a retention plate 56 formed in a disc shape is in abutting contact with the end face 38. A communicating hole 60 that communicates with the recess portion 32 of the cap 20 is formed in the center portion of the retention plate 56 as seen in the axial direction. Moreover, through holes 62 running through the retention plate 56 in the thickness direction thereof are formed in the retention plate 56 in positions corresponding to the fastening holes 54 in the end face 38. Bolts 64 are passed through and fastened in the through holes 62 and the fastening holes 54 in the end face 38, whereby the retention plate 56 is attached to the end face 38. It will be noted that the diameter of the retention plate 56 is set to be substantially identical to that of the general portion (the portion other than the packing accommodating portion 26) of the body insertion portion 22. That is to say, an outer peripheral surface 68 of the retention plate 56 opposes the inner peripheral surface of the body portion 12. The end portion on one axial direction side and the end portion on the other axial direction side of the body portion 12 are plugged by the body insertion portions 22 of the caps 20 described above.

The projecting portion 30 is provided on an axial direction outer end portion 72 of the cap 20. Specifically, the projecting portion 30 is provided in a position corresponding to an axis C on the axial direction outer end portion 72 of the cap 20 and is formed in a closed cylindrical shape that projects outward in the axial direction (see FIG. 4B). Inside the projecting portion 30 is formed a fastening hole 74 having a threaded portion formed in its inner peripheral surface, and the opening of the communicative flow path 24 is provided in a bottom portion 76 of the fastening hole 74.

The communicative flow path 24 is formed inside the cap 20. The communicative flow path 24 is provided along the axial direction inside the body insertion portion 22 and communicates the inside of the cap 20 to the outside. Additionally, a coupling pipe coupled to the communicative flow paths 24 of other plural high-pressure tanks is connected to the communicative flow path 24. Because of this, the insides of the body portions 12 of the plural high-pressure tanks 10 are communicated with each other. A valve is provided in the coupling pipe, and because of this the volume of fluid flowing in the communicative flow path 24 and therefore the coupling pipe can be controlled. Additionally, the coupling pipe is connected to a fuel cell stack or the like.

The second reinforcement layer 16 is provided on the radial direction outer side of the first reinforcement layer 14 and on the outer surfaces of the pair of caps 20. The second reinforcement layer 16 is configured by carbon fiber-reinforced plastic (CFRP) having plural fibers 78 inside (see FIG. 1 and FIG. 3). It will be noted that in the drawings the fibers 78 are depicted as being fatter than they actually are in order to show them in a way that is easy to understand, and the fibers 78 are also depicted as being fewer in number than they actually are in order to show the fiber direction of the fibers 78 in a way that is easy to understand.

Figure 3:
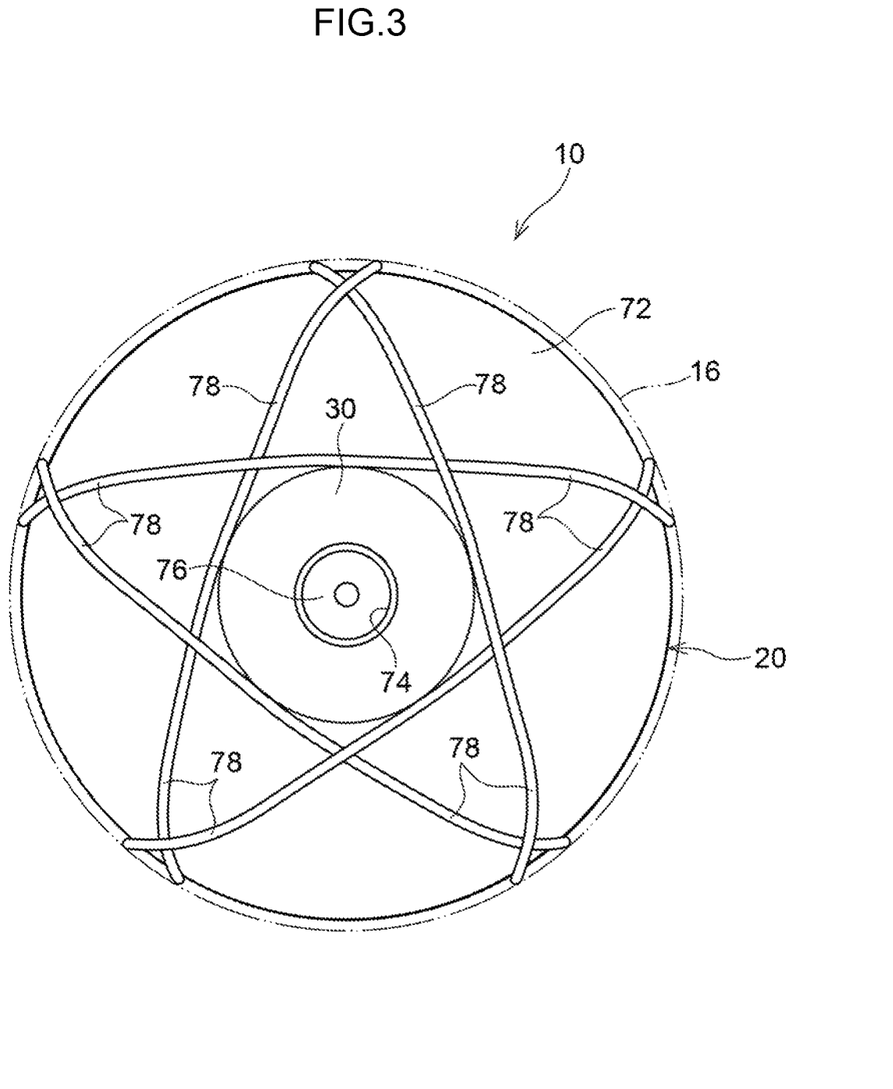
FIG. 3 is a schematic view schematically showing, as seen in an axial direction, fibers of a second reinforcement layer at an axial direction outer end portion of a cap of the high-pressure vessel pertaining to the first embodiment.
Figure 5:
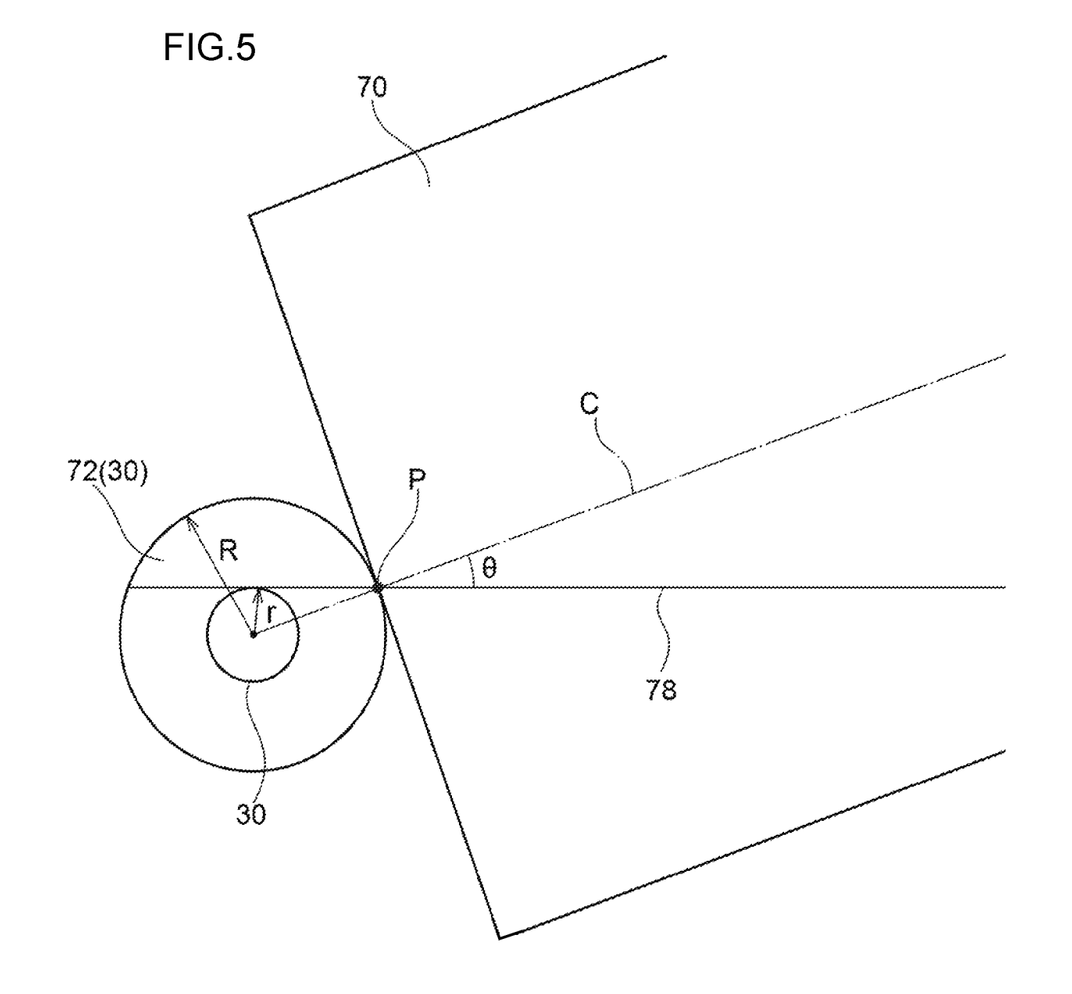
FIG. 5 is a schematic developed diagram for describing the relationship between the axial direction of the high-pressure vessel pertaining to the first embodiment and the fiber direction of the second reinforcement layer.

As shown in FIG. 3, the fibers 78 of the second reinforcement layer 16 are wound around the axial direction outer end portions 72 of the caps 20. Specifically, the fibers 78 are wound linearly adjacent to base portions 82 (see FIG. 1) of the projecting portions 30 of the caps 20 as seen in the axial direction. In other words, the fibers 78 are wound passing near geodesics of the axial direction outer end portions 72 of the caps 20. The fibers 78 wound around the axial direction outer end portions 72 of the caps 20 are, as shown in FIG. 1, wound on the first reinforcement layer 14 (see FIG. 2) of the body portion 12 toward the other caps 20 at an inclination of a predetermined angle θ to the axial direction as seen in a direction orthogonal to the axial direction (a helical winding). It will be noted that the predetermined angle is set to an angle θ formed by the axis C and the fibers 78 that linearly join contact points P between the axial direction outer end portions 72 of the caps 20 of radial dimension R and the body portion 12 to the outer peripheral surfaces of the projecting portions 30 of radial dimension r in a state in which the high-pressure tank 10 is schematically developed on a plane as shown in FIG. 5. In the case of the present embodiment, the predetermined angle is set to about 24° as an example. Because of this, the fibers 78 are biased toward the base portion 82 sides of the projecting portions 30 at the axial direction outer end portions 72 of the caps 20.

As shown in FIG. 1, the fibers 78 wound over the first reinforcement layer 14 of the body portion 12 from one cap 20 toward the other cap 20 are wound passing near geodesics at the axial direction outer end portion 72 of the other cap 20 in the same way as they are at the one cap 20. Additionally, the fibers 78 are wound in the aforementioned helical winding from the other cap 20 to the one cap 20. The second reinforcement layer 16 is formed by repeating the above process multiple times to form a layer (see the dashed double-dotted line in FIG. 1). Additionally, the second reinforcement layer 16 and the first reinforcement layer 14 are integrated with each other by adding the step of heating and hardening them at the same timing after the fibers 78 have been wound around the body portion 12 and the caps 20. It will be noted that in FIG. 2 the first reinforcement layer 14 and the second reinforcement layer 16 are depicted as separate members in order to show them in a way that it easy to understand.

Action and Effects of First Embodiment

Next, the action and effects of the present embodiment will be described.

In the present embodiment, as shown in FIG. 1, the body portion 12 is formed in an open cylindrical shape, both axial direction end portions of the body portion 12 are open, and the body insertion portions 22 of the pair of caps 20 are inserted into both end portions of the body portion 12 so as to plug both end portions. The first reinforcement layer 14 configured by fiber-reinforced plastic whose fiber direction coincides with the circumferential direction of the body portion 12 is provided on the outer peripheral surface 18 of the body portion 12. Consequently, the pressure resistance of the body portion 12 in its circumferential direction and radial direction is improved.

Here, the second reinforcement layer 16 integrated with the first reinforcement layer 14 and configured by fiber-reinforced plastic including the fibers 78 that bridge one end portion and the other end portion in the axial direction of the body portion 12 is provided. Consequently, even in a case where loads outward in the axial direction have been input along the axial direction to the axial direction end portions of the body portion 12, the loads outward in the axial direction can be received by the second reinforcement layer 16 bridging the one cap 20 and the other cap 20 and the first reinforcement layer 14 integrated with the second reinforcement layer 16. Consequently, the pressure resistance in the axial direction of the high-pressure tank 10 itself can be improved. Because of this, the pressure resistance of the vessel can be improved.

Furthermore, the projecting portions 30 that project outward along the axial direction are provided in the center portions of the axial direction outer end portions 72 of the caps 20. Furthermore, the fiber direction of the fibers 78 of the second reinforcement layer 16 is inclined the predetermined angle θ to the axial direction as seen in a direction orthogonal to the axial direction of the body portion 12, in such a way that the fibers 78 are biased toward the base portion 82 sides of the projecting portions 30 as seen in the axial direction. Consequently, the fibers 78 of the second reinforcement layer 16 can be kept from laterally sliding outward in the radial direction of the caps 20. Because of this, the second reinforcement layer can be kept from falling away from the caps.

Moreover, the recess portions 32 that open toward the inside of the body portion 12 and are recessed outward in the axial direction of the body portion 12 are formed in the body insertion portions 22 of the caps 20 inserted inside the body portion 12. Consequently, the capacity of the inside of the high-pressure tank 10 can be further increased by the recess portions.

Second Embodiment

Next, a high-pressure tank 90 pertaining to a second embodiment of the present disclosure will be described using FIG. 6 to FIG. 8. It will be noted in regard to constituent parts identical to those in the first embodiment that identical reference signs are assigned thereto and description thereof will be omitted.

The high-pressure tank 90 pertaining to the second embodiment has the same basic configuration as the high-pressure tank 10 pertaining to the first embodiment, but is characterized in that plural protruding portions 92 are provided on the caps 20.

Figure 6:
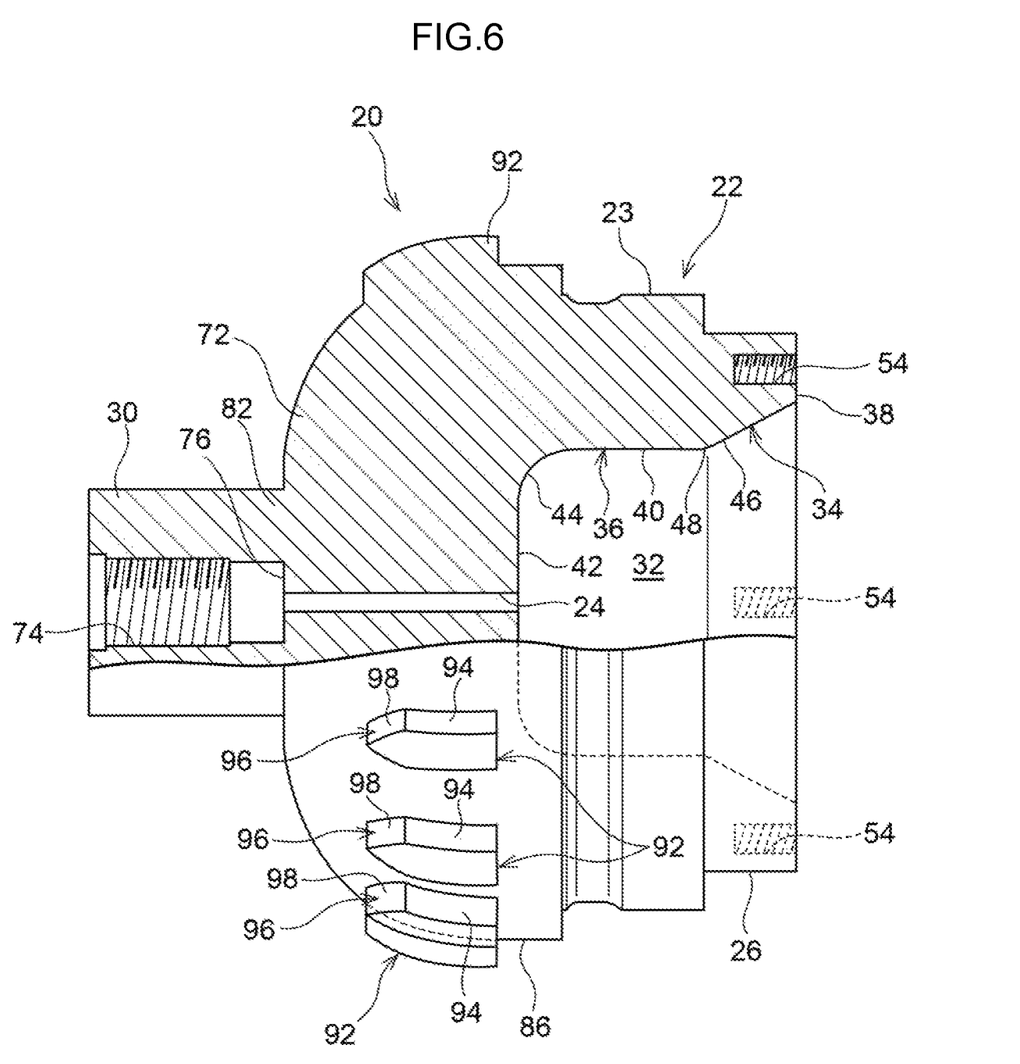
FIG. 6 is a partial cross-sectional view showing the cap in a second embodiment.
Figure 7:
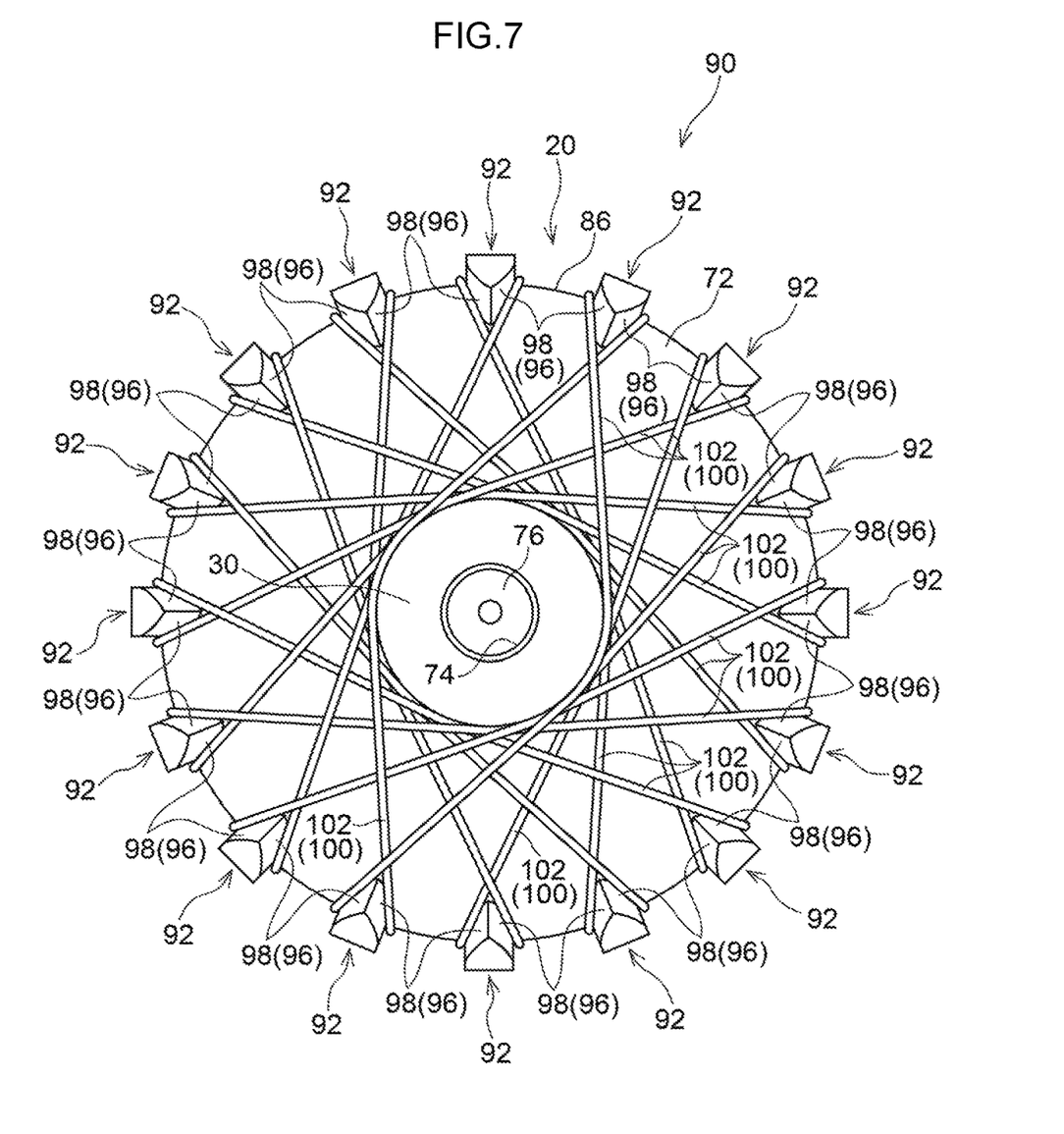
FIG. 7 is a schematic view schematically showing, as seen in the axial direction, fibers of a second reinforcement layer at the axial direction outer end portion of the cap of a high-pressure vessel pertaining to the second embodiment.
Figure 8:
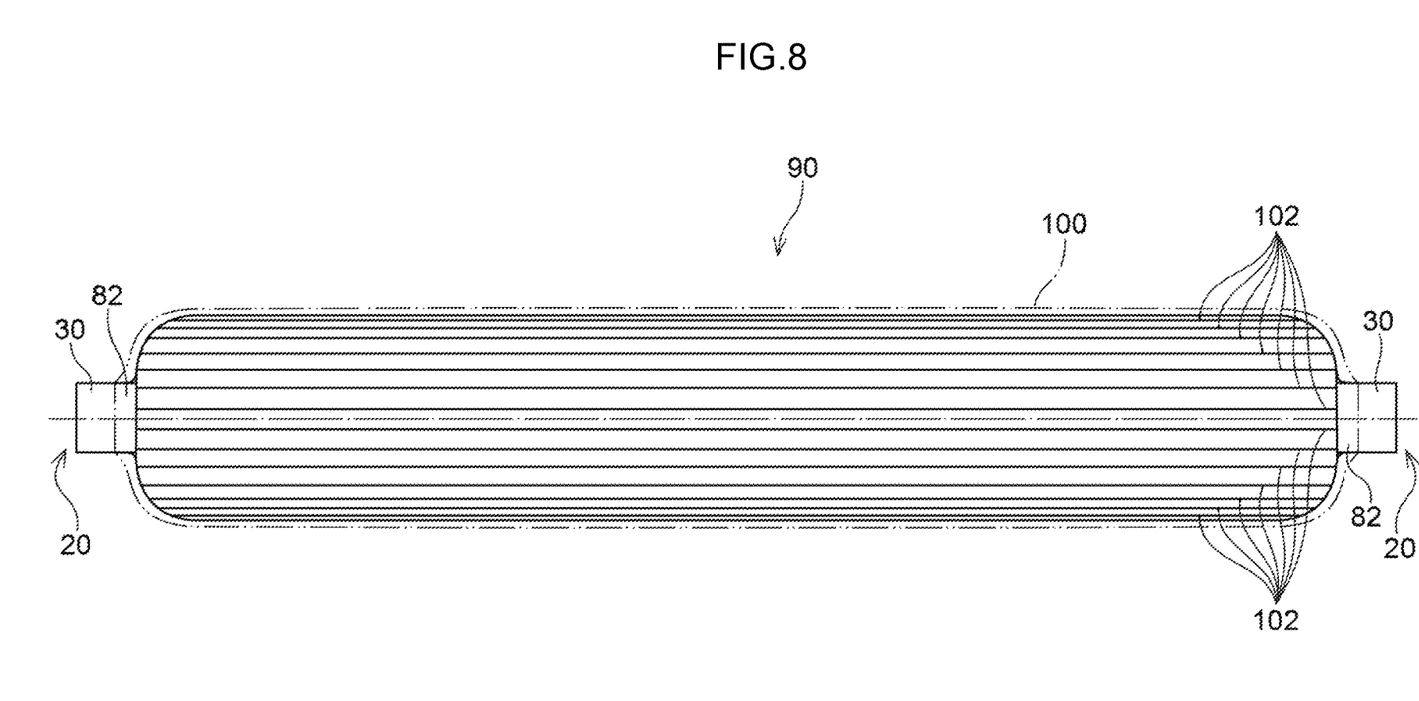
FIG. 8 is a schematic side view showing the high-pressure vessel pertaining to the second embodiment.

Namely, as shown in FIG. 6 and FIG. 7, plural protruding portions 92 that project outward in the radial direction of the caps 20 are provided on outer peripheral surfaces 86 of the axial direction outer end portions 72 of the caps 20. The plural protruding portions 92 are spaced apart from each other at substantially identical intervals. Furthermore, guide surfaces 96 are formed on axial direction outer sides of side surface portions 94 of the protruding portions 92. Each of the guide surfaces 96 is configured by a pair of inclined wall surfaces 98 as shown in FIG. 7, and the inclined wall surfaces 98 are inclined in such a way as to approach each other heading outward in the axial direction.

As shown in FIG. 7, a second reinforcement layer 100 is provided on the radial direction outer side of the first reinforcement layer 14 and on the outer surfaces of the pair of caps 20. The second reinforcement layer 100 is configured by carbon fiber-reinforced plastic (CFRP) having plural fibers 102 inside. It will be noted that in the drawings the fibers 102 are depicted as being fatter than they actually are in order to show them in a way that is easy to understand, and the fibers 102 are also depicted as being fewer in number than they actually are in order to show the fiber direction of the fibers 102 in a way that is easy to understand.

The fibers 102 of the second reinforcement layer 100 are wound around the axial direction outer end portions 72 of the caps 20 through spaces between the protruding portions 92. Specifically, the fibers 102 are wound from between one pair of mutually adjacent protruding portions 92 to between another pair of mutually adjacent protruding portions 92 substantially opposite the one pair of mutually adjacent protruding portions 92, in such a way that the fibers 102 are in abutting contact with the base portions 82 (see FIG. 1) of the projecting portions 30 of the caps 20 as seen in the axial direction. As shown in FIG. 8, the fibers 102 wound on the axial direction outer end portions 72 of the caps 20 are wound on the first reinforcement layer 14 of the body portion 12 from the axial direction outer end portion 72 of one cap 20 along the axial direction toward the other cap 20 as seen in a direction orthogonal to the axial direction.

The fibers 102 wound over the first reinforcement layer 14 of the body portion 12 from one cap 20 toward the other cap 20 are wound from between one pair of mutually adjacent protruding portions 92 to between another pair of mutually adjacent protruding portions 92 substantially opposite the one pair of mutually adjacent protruding portions 92 at the axial direction outer end portion 72 of the other cap 20 in the same way as they are the one cap 20. Additionally, the fibers 102 are wound along the axial direction from the other cap 20 to the one cap 20. The second reinforcement layer 100 is formed by repeating the above process multiple times to form a layer (see the dashed double-dotted line in FIG. 8). It will be noted that the second reinforcement layer 100 and the first reinforcement layer 14 are integrated with each other by adding the step of heating and hardening them at the same timing after the fibers 102 have been wound around the body portion 12 and the caps 20.

Action and Effects of Second Embodiment

Next, the action and effects of the present embodiment will be described.

According to the above-described configuration also, the high-pressure tank 90 is configured in the same way as the high-pressure tank 10 of the first embodiment except that the plural protruding portions 92 are provided on the caps 20, so the same effects as those of the first embodiment are obtained. Furthermore, the plural protruding portions 92 spaced apart from each other along the circumferential direction of the body portion 12 are provided on the outer peripheral surfaces 86 of the axial direction outer end portions 72 of the caps 20, and the fibers 102 of the second reinforcement layer 100 are disposed between the plural protruding portions 92 along the axial direction. Consequently, the fibers 102 can be prevented from sliding on the caps 20 and no longer catching on the caps 20 because movement of the fibers 102 of the second reinforcement layer 100 on the caps 20 is limited by the protruding portions 92, so the fibers 102 can be disposed parallel to the axial direction of the body portion 12 as seen in a direction orthogonal to the axial direction. That is to say, the fiber direction of the fibers 102 and the axial direction become the same direction, so loads outward in the axial direction can be more reliably received by the fibers 102 of the second reinforcement layer 100. Because of this, the pressure resistance in the axial direction can be further improved.

Furthermore, in the present embodiment, the fiber direction of the fibers 102 and the axial direction become the same direction as seen in a direction orthogonal to the axial direction. That is to say, the fibers 102 bridge the one end portion and the other end portion of the high-pressure tank 90 by the shortest distance, so the weight of the fibers 102 and therefore the second reinforcement layer 100 can be reduced.

It will be noted that although in the first and second embodiments the recess portions 32 provided in the caps 20 are formed in a substantially open cylindrical shape, the recess portions 32 are not limited to this and may also be formed in another shape such as a domed shape.

Furthermore, the high-pressure tank has a configuration where the caps 20 are inserted into the end portion on one axial direction side and the end portion on the other axial direction side of the body portion 12, but the high-pressure tank is not limited to this and may also have a configuration where a cap 20 is provided only on at least one end portion in the axial direction of the body portion 12.

Figure 9:
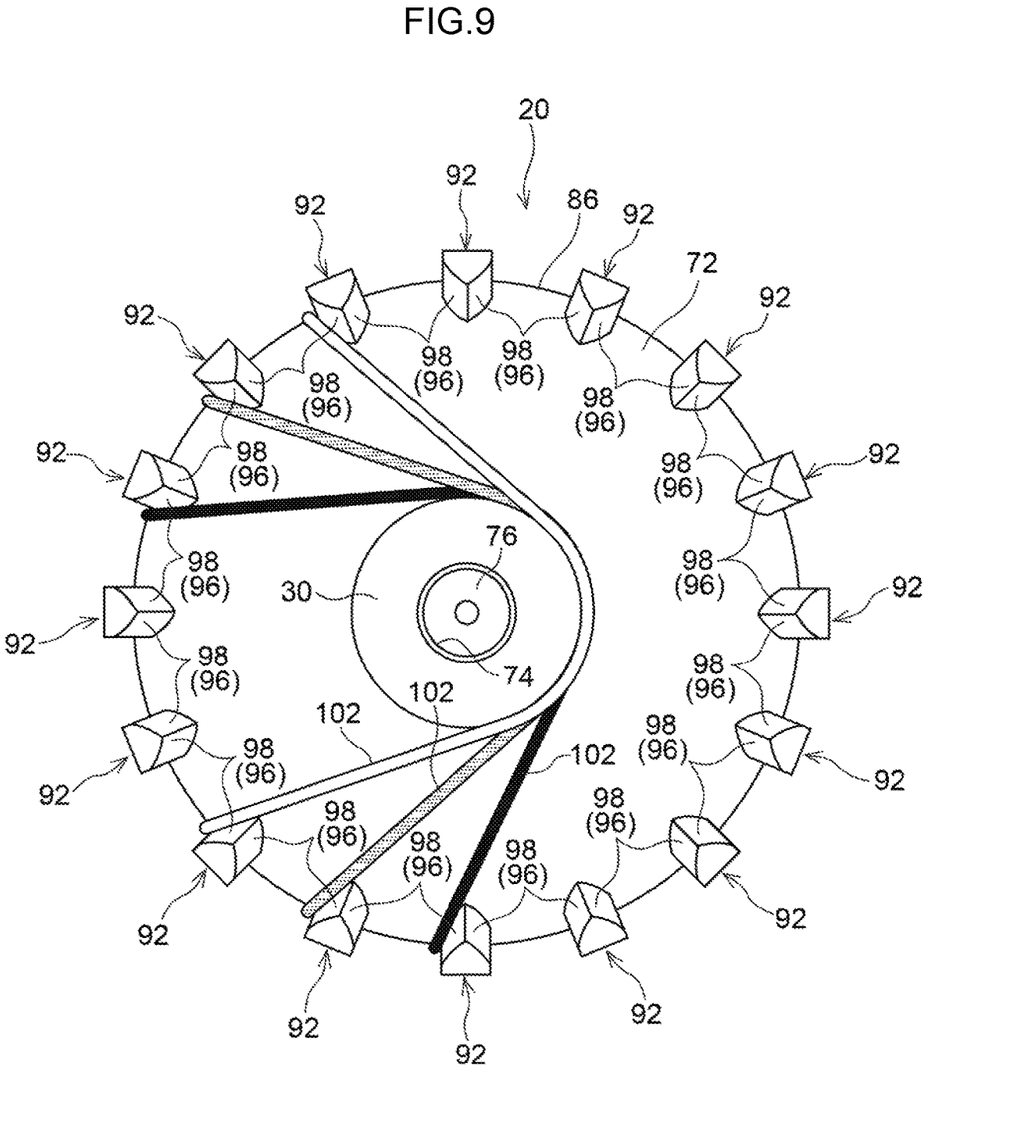
FIG. 9 is a schematic view schematically showing, as seen in the axial direction, the fibers of the second reinforcement layer at the axial direction outer end portion of the cap of the high-pressure vessel pertaining to the second embodiment.

Moreover, in the second embodiment, the fibers 102 of the second reinforcement layer 100 are wound from between one pair of mutually adjacent protruding portions 92 to between another pair of mutually adjacent protruding portions 92 substantially opposite the one pair of mutually adjacent protruding portions 92, in such a way that the fibers 102 are in abutting contact with the base portions 82 of the projecting portions 30 of the caps 20 as seen in the axial direction. However, the fibers 102 are not limited to this and, as shown in FIG. 9, a process may be repeated wherein the fibers 102 are made to curve along the base portions 82 from between one pair of mutually adjacent protruding portions 92 and wound between another pair of mutually adjacent protruding portions 92 positioned at a substantially right angle to the one pair of mutually adjacent protruding portions 92 (clockwise in FIG. 9 starting with the solid black line and proceeding in the order of the hatched line and the white line). The fibers 102 may also be wound in another way.

A high-pressure vessel of a first aspect includes: a body portion that is formed in an open cylindrical shape, with at least one end portion of the body portion in the axial direction thereof being open; a cap, at least part of which is inserted inside the open end portion of the body portion to thereby plug the end portion; a first reinforcement layer provided on an outer peripheral surface of the body portion and configured by fiber-reinforced plastic whose fiber direction coincides with the circumferential direction of the body portion; and a second reinforcement layer integrated with the first reinforcement layer and configured by fiber-reinforced plastic including fibers that bridge the one end portion and the other end portion in the axial direction of the body portion.

According to the first aspect, the body portion is formed in an open cylindrical shape, at least one end portion of the body portion in the axial direction thereof (hereinafter simply called "the axial direction") is open, and at least part of the cap is inserted inside the end portion to thereby plug the end portion. The first reinforcement layer configured by fiber-reinforced plastic whose fiber direction coincides with the circumferential direction of the body portion is provided on the outer peripheral surface of the body portion. Consequently, the pressure resistance of the body portion in its circumferential direction and radial direction is improved.

Here, the second reinforcement layer integrated with the first reinforcement layer and configured by fiber-reinforced plastic including fibers that bridge the one end portion and the other end portion in the axial direction of the body portion is provided in the high-pressure vessel. Consequently, even in a case where loads outward in the axial direction have been input along the axial direction to the axial direction end portions of the body portion, the loads outward in the axial direction can be received by the second reinforcement layer bridging the one cap and the other cap and the first reinforcement layer integrated with the second reinforcement layer. Consequently, the pressure resistance in the axial direction of the high-pressure vessel itself can be improved.

A high-pressure vessel of a second aspect is the first aspect, wherein a projecting portion that projects outward along the axial direction of the body portion is provided in a center portion of an axial direction outer end portion of the cap in the axial direction of the body portion, and the fiber direction of the fibers of the second reinforcement layer is inclined a predetermined angle to the axial direction of the body portion as seen in a direction orthogonal to the axial direction of the body portion, in such a way that the fibers of the second reinforcement layer are biased toward a base portion side of the projecting portion as seen in the axial direction of the body portion.

According to the second aspect, the projecting portion that projects outward along the axial direction is provided in the center portion of the axial direction outer end portion of the cap. Furthermore, the fiber direction of the fibers of the second reinforcement layer is inclined the predetermined angle to the axial direction as seen in a direction orthogonal to the axial direction of the body portion, in such a way that the fibers of the second reinforcement layer are biased toward the base portion side of the projecting portion as seen in the axial direction. Consequently, the fibers of the second reinforcement layer can be kept from laterally sliding outward in the radial direction of the cap.

A high-pressure vessel of a third aspect is the first aspect, wherein plural protruding portions spaced apart from each other along the circumferential direction of the body portion are provided on an outer peripheral surface of an axial direction outer end portion of the cap in the axial direction of the body portion, and the fibers of the second reinforcement layer are disposed between the plural protruding portions in the axial direction of the body portion, and the fiber direction of the fibers of the second reinforcement layer is disposed parallel to the axial direction of the body portion as seen in a direction orthogonal to the axial direction of the body portion.

According to the third aspect, the plural protruding portions spaced apart from each other along the circumferential direction of the body portion are provided on the outer peripheral surface of the axial direction outer end portion of the cap, and the fibers of the second reinforcement layer are disposed between the plural protruding portions along the axial direction. Consequently, the fibers can be prevented from sliding on the cap and no longer catching on the cap because the protruding portions limit movement of the fibers of the second reinforcement layer on the cap. Because of this, the fibers can be disposed parallel to the axial direction of the body portion as seen in a direction orthogonal to the axial direction. That is to say, the fiber direction of the fibers and the axial direction become the same direction, so loads outward in the axial direction can be more reliably received by the fibers of the second reinforcement layer.

A high-pressure vessel of a fourth aspect is any of the first to third aspects, wherein a recess portion that opens toward the inside of the body portion and is recessed outward in the axial direction of the body portion is formed in the part of the cap inserted inside the body portion.

According to the fourth aspect, the recess portion that opens toward the inside of the body portion and is recessed outward in the axial direction of the body portion is formed in the part of the cap inserted inside the body portion. Consequently, the capacity of the inside of the high-pressure vessel can be further increased by the recess portion.

The high-pressure vessel of the first aspect can improve the pressure resistance of the vessel.

The high-pressure vessel of the second aspect can keep the second reinforcement layer from falling away from the cap.

The high-pressure vessel of the third aspect can further improve the pressure resistance in the axial direction.

The high-pressure vessel of the fourth aspect can increase the inside capacity.

Embodiments of the present disclosure have been described above, but the present disclosure is not limited to what is described above and can be modified and implemented in a variety of ways in addition to what is described above in a range that does not depart from the spirit thereof.

What is claimed is:

1. A high-pressure vessel comprising:
   a body portion formed in a cylindrical shape, with at least one end portion of the body portion, in an axial direction thereof, being open;
   a cap with a central protruding portion at a center of the cap, at least part of is the cap being inserted inside at least one open end portion of the body portion to plug the at least one open end portion;
   a first reinforcement layer provided on an outer peripheral surface of the body portion and made of fiber-reinforced plastic, the fiber-reinforced plastic having a first extending direction of internal fibers that coincides with a circumferential direction of the body portion; and
   a second reinforcement layer integrated with the first reinforcement layer and made of fiber-reinforced plastic including fibers that bridge one end portion and another end portion, in the axial direction, of the body portion, wherein
   plural protruding portions, spaced apart from each other along the circumferential direction of the body portion, are provided on an outer peripheral surface of an axial direction outer end portion of the cap, each of the protruding portions configured with at least one guide surface on a side surface of the protruding portion, and
   the fibers of the second reinforcement layer are disposed between the plural protruding portions in the axial direction of the body portion, the fibers of the second reinforcement layer abut on the guide surface and extend from between a first pair of the protruding portions toward and around the central protruding portion to abut around a portion of the central protruding portion and extend to between a second pair of the protruding portions that is substantially ninety degrees from the first pair of protruding portions with respect to the center of the cap, and fibers of the second reinforcement layer extending in a second extending direction parallel to the axial direction of the body portion, as seen in a direction orthogonal to the axial direction of the body portion.

2. The high-pressure vessel according to claim 1, wherein:
   the second extending direction is inclined by a predetermined angle with respect to the axial direction of the body portion as seen in a direction orthogonal to the axial direction of the body portion, in such a way that the fibers of the second reinforcement layer are biased toward a base portion side of the central protruding portion as seen in the axial direction of the body portion.

3. The high-pressure vessel according to claim 1, wherein the protruding portions are spaced apart from each other at identical intervals.

4. The high-pressure vessel according to claim 1, wherein:
   guide surfaces including a pair of inclined wall surfaces are formed on axial direction outer sides of side surface portions of the protruding portions, and
   the inclined wall surfaces are inclined in such a way as to approach each other heading outward in the axial direction.

5. The high-pressure vessel according to claim 1, wherein a recess portion that opens toward an interior of the body portion and is recessed outward in the axial direction of the body portion is formed in the part of the cap inserted inside the body portion.

6. A high-pressure vessel comprising:
   a body portion formed in a cylindrical shape, with at least one end portion of the body portion, in an axial direction thereof, being open;
   a cap, at least part of which is inserted inside at least one open end portion of the body portion to plug the at least one open end portion;
   a first reinforcement layer provided on an outer peripheral surface of the body portion and made of fiber-reinforced plastic, the fiber-reinforced plastic having a first extending direction of internal fibers that coincides with a circumferential direction of the body portion; and
   a second reinforcement layer integrated with the first reinforcement layer and made of fiber-reinforced plastic including fibers that bridge one end portion and another end portion, in the axial direction, of the body portion, wherein
   plural protruding portions, spaced apart from each other along the circumferential direction of the body portion, are provided on an outer peripheral surface of an axial direction outer end portion of the cap, each of the protruding portions comprising two guide surfaces on circumferentially opposed side surfaces of the protruding portion, wherein the two guide surfaces are inclined toward each other approaching a center of the cap, and the fibers of the second reinforcement layer are disposed between the plural protruding portions in the axial direction of the body portion, the fibers of the second reinforcement layer abut on the guide surface, and fibers of the second reinforcement layer extending in a second extending direction parallel to the axial direction of the body portion, as seen in a direction orthogonal to the axial direction of the body portion.

7. The high-pressure vessel according to claim 6, wherein:

a projecting portion that projects outward along the axial direction of the body portion is provided at a center portion of an axial direction outer end portion of the cap, and the second extending direction is inclined by a predetermined angle with respect to the axial direction of the body portion as seen in a direction orthogonal to the axial direction of the body portion, in such a way that the fibers of the second reinforcement layer are biased toward a base portion side of the projecting portion as seen in the axial direction of the body portion.

8. The high-pressure vessel according to claim 6, wherein the protruding portions are spaced apart from each other at identical intervals.

9. The high-pressure vessel according to claim 6, wherein:

guide surfaces including a pair of inclined wall surfaces are formed on axial direction outer sides of side surface portions of the protruding portions, and the inclined wall surfaces are inclined in such a way as to approach each other heading outward in the axial direction.

10. The high-pressure vessel according to claim 6, wherein a recess portion that opens toward an interior of the body portion and is recessed outward in the axial direction of the body portion is formed in the part of the cap inserted inside the body portion.

* * * * *